United States Patent [19]
Mould

[11] 3,733,131
[45] May 15, 1973

[54] OPTICAL BEAM SWITCHING DEVICES UTILIZING A PAIR OF PLANE MIRRORS

[75] Inventor: Henry Manifold Mould, Penn, England

[73] Assignee: Perkin-Elmer Limited, Beaconsfield, Buckinghamshire, England

[22] Filed: Aug. 5, 1971

[21] Appl. No.: 169,343

[52] U.S. Cl. .....................356/100, 350/34, 356/93
[51] Int. Cl. ..............................G01j 3/12, G01j 3/42
[58] Field of Search......................356/95, 99, 100, 356/101, 51; 350/34

[56] References Cited

UNITED STATES PATENTS

| | | | |
|---|---|---|---|
| 3,472,595 | 10/1969 | Hashizume | 356/100 |
| 3,390,604 | 7/1968 | Makabe | 356/101 |
| 3,256,769 | 6/1966 | Matthews et al. | 356/95 |
| 2,680,999 | 6/1954 | Newton | 350/35 UX |
| 3,306,158 | 2/1967 | Makabe et al. | 356/101 |
| 2,578,013 | 12/1951 | Monk | 350/34 |

Primary Examiner—Ronald L. Wibert
Assistant Examiner—V. P. McGraw
Attorney—Edward R. Hyde, Jr.

[57] ABSTRACT

Where it is desired to "switch" a beam of radiant energy from a first to a second receiving element, it is proposed to introduce into the beam a pair of parallel facing plane mirrors rigidly attached to each other, along a line parallel to the reflective surfaces. This eliminates undesired change in the direction of the reflected beam caused by unintentional rotation of the two-mirror assembly about the line of introduction. The device may be used in a two-grating scanning monochromator to cause gradual change-over of the beam from one grating to the other. The two-mirror assembly movement is preferably interconnected to the grating drive to cause movement of the assembly at the appropriate time, and preferably in such manner as to allow reversing of the monochromator.

6 Claims, 5 Drawing Figures

INVENTOR
Henry Manifold Mould
BY Daniel R Levinson
ATTORNEY

INVENTOR
Henry Manifold Mould
BY Daniel R Levinson
ATTORNEY

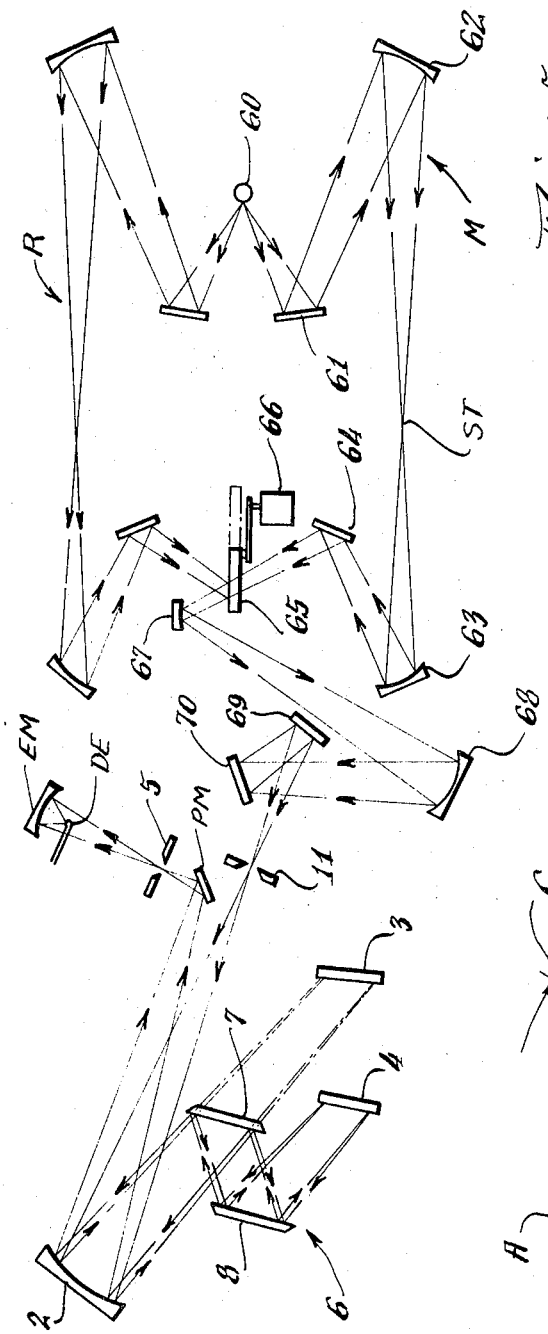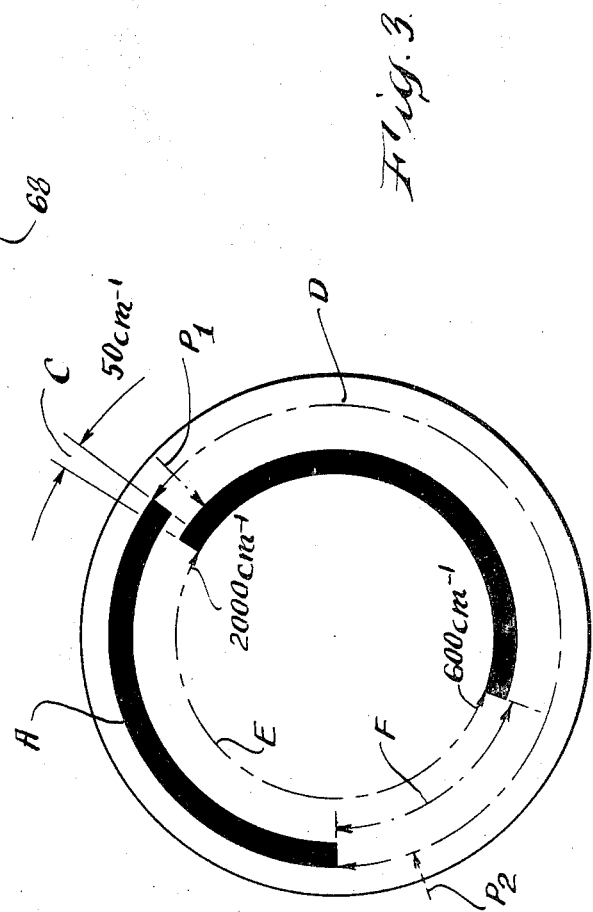
Fig. 5.
Fig. 3.
INVENTOR
Henry Manifold Mould
BY Daniel R. Levinson
ATTORNEY.

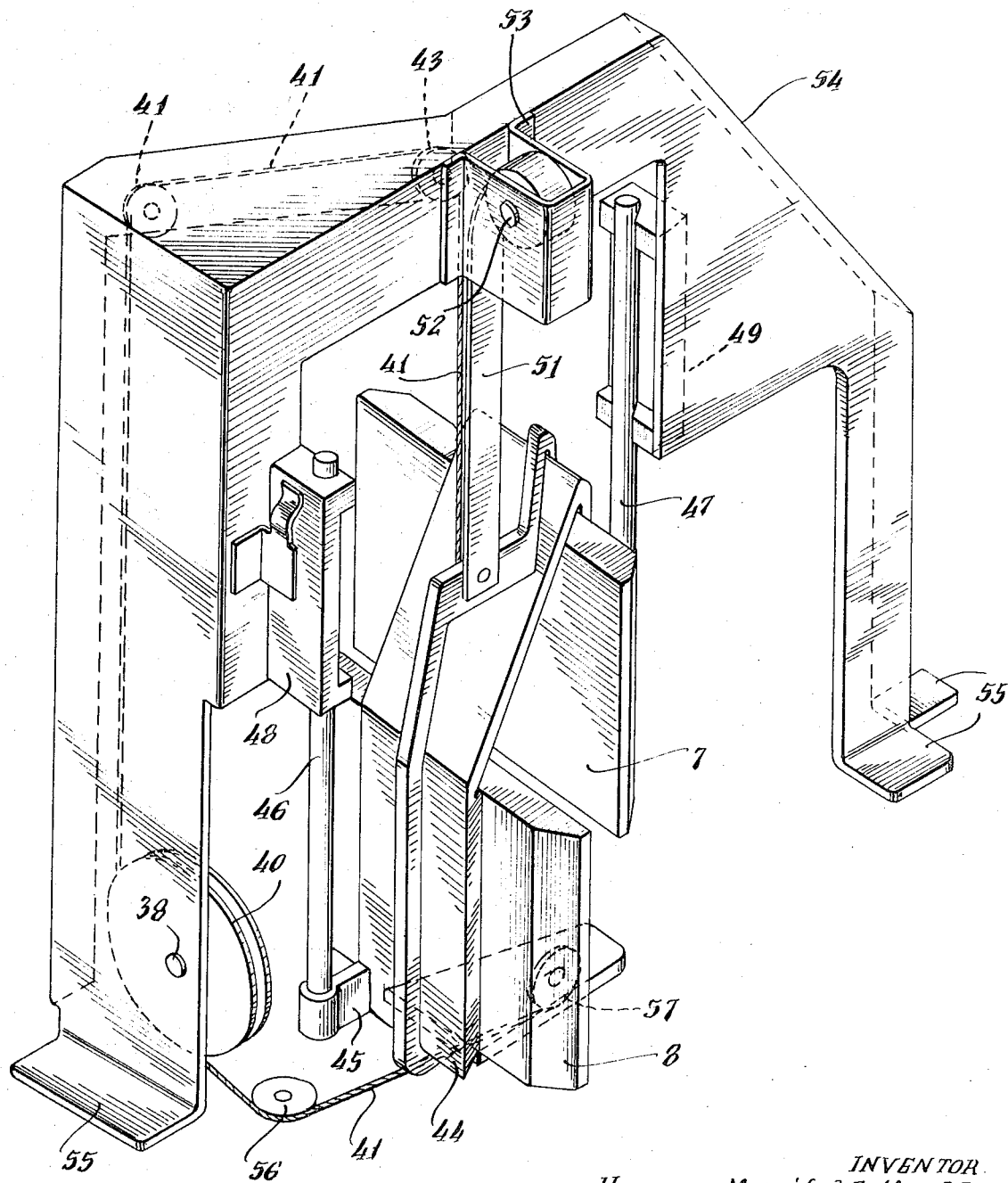

OPTICAL BEAM SWITCHING DEVICES UTILIZING A PAIR OF PLANE MIRRORS

This invention relates to apparatus incorporating a plane mirror device slidable in a predetermined plane between two extreme positions for selectively causing a beam of radiant energy from a source to fall upon one or other of two distinct receiving surfaces without introducing spurious variations in the angle of incidence and with a gradual change-over or "see-saw" transfer of the light flux from one to the other receiving surface.

A practical and important example of an apparatus of the type defined above is in the monochromator (of, for example, an infrared spectrophotometer) wherein a given range of the (infrared) spectrum is covered by two consecutively scanning gratings and a stepless change over from one to other grating is provided by means of a slidable mirror performing the function outlined above.

It has already been proposed to cause the gratings to scan coincidently a small wavelength region around the change-over point, and during the scan overlap to cause a single slidable mirror to effect the gradual switch over of the (spectrophotometer) beam from the entrance slit of the monochromator so that the radiation falling upon the outgoing grating gradually decreases and that on the incoming grating correspondingly increases until the latter grating takes over completely and the entire beam falls upon it. It is easily appreciated that in the switching operation described the slidable mirror must be displaced in an accurately defined plane (i.e., the plane of its reflective surface) and any deviations from the true path due to mechanical imperfections in the displacement would tend to cause undesired variations in the angle of incidence of the radiation falling upon the incoming grating, whereas said incident angle should of course be determined solely by the angle of rotation of the grating. Naturally, the greater the wavelength change per degree rotation the more serious the problem becomes.

The present invention greatly lessens the requirement for mechanical accuracy in the displacement of the slidable mirror by ensuring that the effect of any mechanical irregularities tending to alter the angle of incidence of the radiant energy (hereinafter also referred to for convenience as "light") beam in the course of the beam switching operation is automatically cancelled. In particular the invention utilizes a pair of plane mirrors (rigidly attached to each other) instead of a single mirror.

According to the present invention there is provided an apparatus comprising a first light receiving medium, means for defining the path of a beam of light (from a light source) onto said first light receiving medium, a second light receiving medium and a pair of plane mirrors mounted face to face in accurately fixed angular (e.g., parallel) relationship upon a support to form therewith a twin-mirror assembly movable between a rest (or inactive) and an operative (i.e., active) position along a substantially rectilinear track and so arranged that in operation as the assembly is moved from the rest to the operative position the beam is gradually switched from said first to said second receiving medium with a constant angle of incidence.

Where the light receiving media are movable and interrelated in motion, the twin-mirror assembly is preferably mechanically slaved in motion to the drive of said media. In certain situations, however, the assembly may be moved between rest and operative positions and vice versa either before or after the interrelated motion of said media has taken place. In a two-grating monochromator for a spectrophotometer, for example, the twin-mirror assembly is preferably slaved to the grating drive so that the monochromator beam is switched from one to other grating while the gratings scan an overlap (i.e., the same) region of the spectrum. It is possible, however, that the twin-mirror assembly may be made to perform the switching operation while neither grating is scanning.

If the twin-mirror assembly is slaved to the drive of said media the slaving is preferably such that no limitation is imposed upon the reverse operation of the drive, this being particularly important in the case of the spectrophotometer referred to where reverse operation of the grating drive is a desirable feature.

The main object of the invention is thus to provide a reflective means for causing the change-over of a beam of radiation from one receiving surface to another, which reflective means causes a constant angle of deviation (which may be zero), even though the reflective means is subject to undesired angular movements caused by mechanical imperfections in its desired linear path of movement.

A more specific object of the invention is the use of a pair of generally face-to-face plane reflectors, rigidly attached to each other, as the reflective means in an apparatus of the type described in the just preceding paragraph.

A further particular object of the invention is the provision of a reflective means for causing the change-over of a beam of radiation from one diffraction grating to another in a two-grating monochromator, which reflective means causes a constant angle of deviation and therefore a constant relationship (which may be equality) in the relative angle of incidence of the radiation beam on both gratings, despite undesired angular movements of the reflective means caused by mechanical imperfections in its desired linear path of movement.

Other objects, features and advantages of the invention will be obvious to one skilled in the art from the following detailed description of a single exemplary embodiment of the invention, when read in conjunction with the accompanying drawings, in which:

FIG. 3 is a diagram relating wavenumber ranges to angular travel of the grating drive;

FIG. 4 is a detailed view of an exemplary mounting for the twin-mirror assembly; and FIG. 5 is a highly schematic illustration of a monochromator incorporating the present invention as used to form part of a double-beam (e.g., infrared) spectrophotometer.

Figure 1:
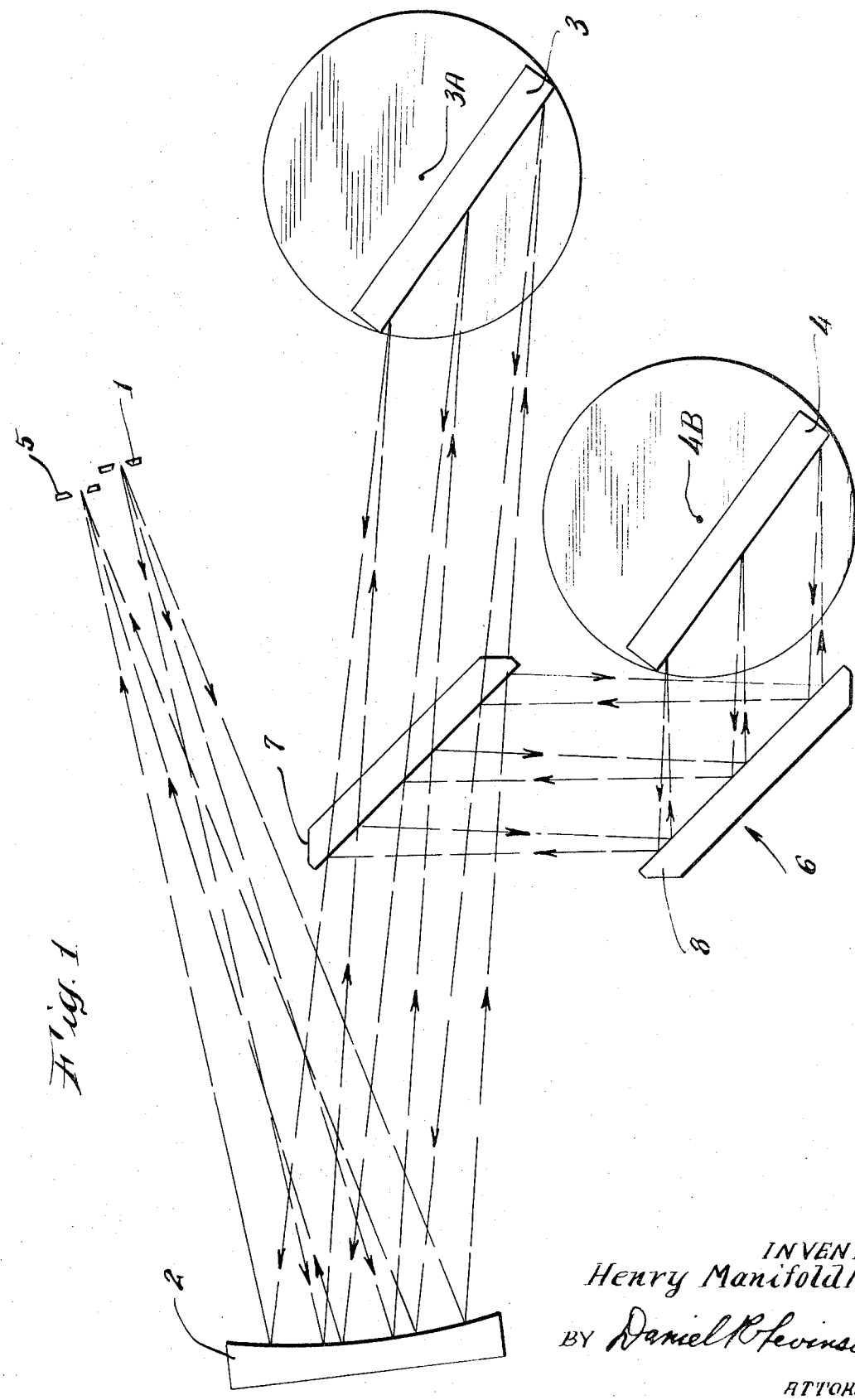
FIG. 1 is a highly simplified schematic of one embodiment of the invention in its application to a two-grating monochromator.

The monochromator represented very schematically in FIG. 1 comprises an entry slit 1, a collimating paraboloid mirror 2, a first diffraction grating 3 mounted for rotation (schematically shown as a circle) around axis 3A, a second diffraction grating 4 rotatably mounted (as also schematically indicated by a circle) around axis 4B, and an exit slit 5. The axes are of course parallel to the elements or lines of the grating. In addition, there is provided a rigid twin-mirror assembly 6, comprising a pair of face-to-face plane mirrors 7 and 8 fixed in accurately parallel relationship upon a support (not shown), the assembly 6 being mounted for reciprocating movement along a rectilinear track perpendicular to the plane of the paper between a rest (inactive) position and an operative position corresponding, respectively, to no interception and full interception of the monochromator optical path between the paraboloid mirror 2 and the grating 3.

In operation, with the assembly 6 in the rest position, rays from a source (not shown) of, say, infrared radiation are focussed at the entry slit 1 by reflecting focussing means (not shown) and are collimated by the paraboloid mirror 2 onto the first grating 3, mirror 2 being spaced from the entry slit 1 by its focal length. Grating 3 returns a collimated bundle of rays to mirror 2 which focusses them at the exit slit 5. As grating 3 is rotated between predetermined angular limits by a grating drive (not shown), the range of wavelengths covered by it is scanned past the exit slit 5 in the normal manner.

The second grating 4 is intended to take over where grating 3 leaves off, in the total range of wavelengths (or wavenumbers) scanned so that an extended wavelength range may be covered in two consecutively scanned parts, a suitable mechanical link, e.g., cam and follower means, slaving the two gratings in motion to the grating drive referred to.

The mechanical link (not shown in FIG. 1) is so arranged that grating 4 is kept stationary or non-scanning while grating 3 is rotated to scan the first part of the overall wavelength range until just before the change-over point is about to be reached when grating 4 is caused to rotate in such angular relationship with grating 3 that over a small angular travel of the latter, say, some 6°, exactly the same wavelengths are scanned in unison by the two gratings over an overlap region of, for example, some 50 wavenumbers.

It is during the scan overlap that the assembly 6 is moved along its rectilinear track from the inactive (rest) position towards the operative position. In the course of this movement, as mirror 7 intercepts more and more of the collimated beam from mirror 2 and the intercepted part of the beam is reflected onto mirror 8 and from that onto grating 4, the contribution of grating 3 to the radiation flux traversing the exit slit 5 decreases as that of grating 4 increases until the operative position is reached and all the contribution comes from grating 4. It will be noted that mirrors 7 and 8 are staggered so that neither obstructs the optical path of the other. The assembly 6 is conveniently slaved to the grating drive so as to become positively interrelated in motion with the rotation of the two gratings. The switch-over of the beam is initiated a few degrees, say, 2, after scan overlap (i.e., the two gratings synchronously scanning the same wavelength or wavenumber interval) begins and is terminated some 2° before the overlap ends.

Parallelism of the two specular reflectors (e.g., front surface mirrors) 7 and 8 insures that the mirror pair introduce no angular deviation if they are tilted (as a pair) in any direction by imprecision in the means for placing (and removing) them from the optical path (e.g., along the direction perpendicular to the plane of the paper in FIG. 1). Merely a non-skew relationship (i.e., the planes of both mirrors being parallel to the same line but not necessarily parallel to each other) is sufficient to avoid angular error in the ray path when the mirror pair is rotated solely about a line parallel to both surfaces, but not rotation about any other axis (i.e., not parallel to both plane surfaces). Such non-skewed (but not parallel) mirrors would be parallel to the line of introduction of the mirror pair into the optical path. Where the introduction means is carefully designed to avoid any angular disturbances except about an axis along (or parallel to) this line of introduction, such non-parallel but non-skewed mirrors would be useful. To obtain a system free of any angular changes in ray paths for any angular disturbance of the mirror pair (about any axis), the mirrors must be parallel to each other.

Figure 2:
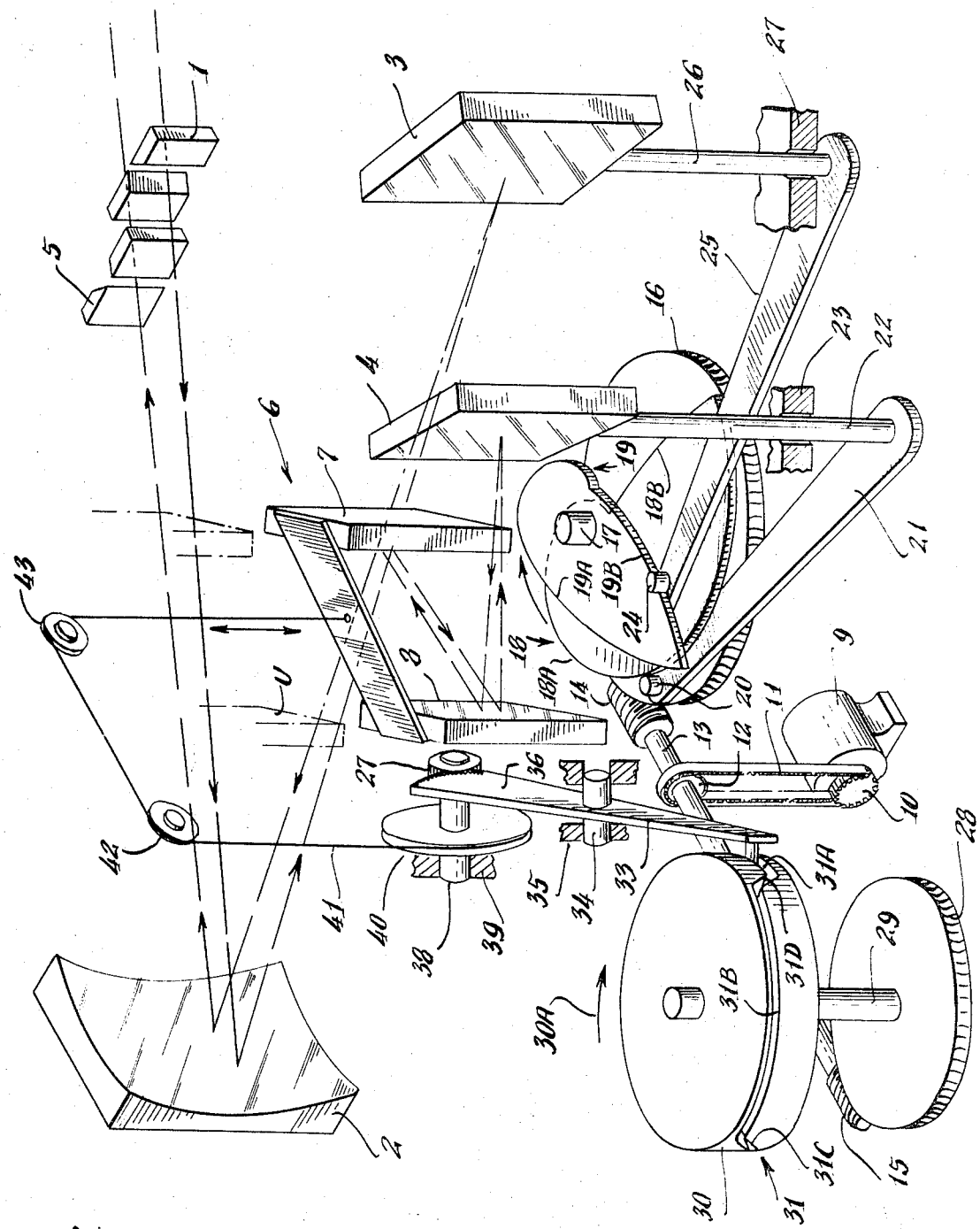
FIG. 2 is a more detailed perspective, somewhat schematic illustration of the embodiment of FIG. 1.

In FIG. 2, in addition to the like referenced parts 1–5 of FIG. 1, the twin-mirror assembly 6 of FIG. 1 and the entire grating drive referred to are shown in some detail to illustrate in particular the manner in which the former may be mechanically slaved in motion to the latter. Motive power is provided by the electric motor 9 having a toothed-pulley 10, which through a toothed-belt 11 drives a second toothed-pulley 12 keyed to a shaft 13 journalled in bearings (not shown) and terminating in end worms 14 and 15. Worm 14 engages worm gear 16 rotatable around the axis of shaft 17 together with cams 18 and 19 (as by elements 16, 18 and 19 all being rigidly attached to shaft 17, which may turn in bearings, not shown, about its own axis).

Cam 18, through follower pin 20, lever 21 and grating shaft 22 journalled in bearing 23, rotates grating 4 around the axis of shaft 22; and likewise cam 19, through follower pin 24, lever 25, grating shaft 26, journalled in bearing 27, rotates grating 3.

Each of cams 18 and 19 is provided with an active or scanning lobe, 18A and 19A respectively, designed to rotate the associated grating according to a law ensuring, say, a linear wavenumber scan, and a return lobe, 18B and 19B respectively, which need not obey any particular law since it has no scanning function to perform but merely turns the grating, say, to an inoperative angle for a predetermined angular travel after the grating has been rotated by the active lobe, and then returns it to a new scan start position.

In the layout of FIG. 2 the entire wavenumber range of the monochromator, say, from 4,000 cm$^{-1}$ to 600 cm$^{-1}$ is covered in two regions, from 4,000 cm$^{-1}$ to about 2,000 cm$^{-1}$ by grating 3 and from about 2,000 cm$^{-1}$ to 600 cm$^{-1}$ by grating 4, the change from one to the other taking place with an overlap of some 50 wavenumbers during which both gratings are scanning in unison.

In the schematic diagram of FIG. 3 sectors A and B represent both the scan ranges of gratings 3 and 4, respectively, and therefore the operative angular travels of active lobes 19A and 18A, respectively, the region of overlap being indicated at C. Likewise, circular portions D and E represent the non-scanning angular travels of gratings 3 and 4, respectively, corresponding to return lobes 19B and 18B, respectively. Finally, sector F represents the angle during which both gratings are inactive. Naturally, the phasing of cams 18 and 19 as well as the other mechanical parameters of the grating drive as a whole are chosen, in known manner, to ensure the mode of operation represented by FIG. 3.

Reverting now to FIG. 2 worm 15 through worm gear 28 fixed to shaft 29 journalled in bearings not shown rotates drum 30 rigidly mounted on shaft 29. The cylindrical surface of drum 30 is machined to define a groove 31 having a lower circular groove portion 31A and an upper circular groove portion 31B, continuity between the two being established by comparatively steep and mainly rectilinear groove portions 31C and 31D. The groove 31 is in effect a cam which cooperates with follower pin 32 in causing lever 33 to oscillate around a pivot 34 rotatable in bearings 35. Lever 33 is provided with a gear quadrant 36 engaging pinion 37 fixed to shaft 38 journalled in bearings 39. Shaft 38 is rigidly attached to pulley 40, to the circumferential groove of which is attached a standard steel cable 41 which when the pulley 40 rotates in a clockwise or an anticlockwise direction (as seen from the right in FIG. 2) lowers and lifts, respectively, the twin-mirror assembly 6 after going over pulleys 42 and 43.

When the follower pin 32 is accommodated in the lower circular groove portion 31A the twin-mirror assembly 6 is in the lower limit or operative position shown in FIG. 2 and when it rides onto the upper circular groove portion 31B, having climbed the rectilinear groove portion 31C (note the direction of rotation of drum 30 as indicated by arrow 30A) the twin-mirror assembly 6 reaches the upper limit (or inactive) position shown in broken lines at U.

It will be observed that since portions 31C and 31D are symmetrical the follower 32 is able to climb portion 31D when the rotation of drum 30 is reversed. This means that the application of the present invention to a monochromator as described need not place any limitation on the reversibility of the grating drive, so that if the user of the infrared spectrophotometer is interested in repetitively scanning only a small region of the spectrum he can save considerable time by returning to a start-scan position through a fast reversing operation.

As should be clear, the twin-mirror assembly 6 switches the incoming beam collimated by paraboloid mirror 2 from one to other of gratings 3 and 4 as the follower pin 32 either climbs or descends, respectively, one or other of the two circular groove portions 31C and 31D. The switching operation is both initiated and completed well within the scan overlap region of gratings 3 and 4 (see section C in FIG. 3). Considering the grating change which in the layout shown in FIG. 2 must be assumed to have just taken place, the follower pin 32 will have ridden a small terminal length of circular groove portion 31B, descended the rectilinear portion 31D and ridden over a small initial length of circular groove portion 31A wholly within the scan overlap region. In other words, the scan overlap begins just before the twin-mirror assembly 6 starts to move either up or down and ends just after the twin-mirror assembly has come to rest. In terms of angular travel of cams 18 and 19 this is something like 2° before and 2° after start and completion of movement of assembly 6, respectively. It will be noted that each of rectilinear groove portions 31C and 31D is rounded off at both ends. This is to assist the follower pin 32 in climbing and descending said portions with a smooth shock-free action.

It can now be appreciated that FIG. 2 shows the position of the parts an operational instant only a few scan degrees after a change from grating 3 to grating 4 has taken place and the twin-mirror assembly 6 has come to rest at the lower limit position. The beam (e.g., in a spectrophotometer) collimated by the paraboloid mirror 2 impinges now on plane mirror 7, bounces off onto plane mirror 8, and from this onto grating 4 and back again to mirrors 8 and 7, in that order, onto paraboloid mirror 2, which finally focusses the exit beam onto exit slit 5. The operational instant shown in FIG. 2 and just referred to corresponds to point P1 on the diagram of FIG. 3. The twin-mirror assembly 6 will start the ascent to the upper limit U when drum 30 has rotated to a position corresponding approximately to point P2 on the same diagram.

No attempt has been made in FIG. 2 to show a complete mount for the twin-mirror assembly 6 and the guideways for reciprocating it in a vertical plane because it would have interfered unduly with a ready appreciation of the construction and operation of the exemplary monochromator according to the present invention. The means for mounting and reciprocating the twin-mirror assembly have been detailed instead in FIG. 4, wherein like parts shown in FIG. 2 are identified by like references.

The specific exemplary twin-mirror assembly 6 comprises front-aluminized plane mirrors 7 and 8 rigidly cemented to a die-cast mount 44 comprising a lug 45 having a bore for supporting therein a vertical steel rod 46. Mount 44 is also provided with a similar lug (not seen) behind mirror 7 supporting vertical steel rod 47. Rods 46 and 47 are slidable up and down in (e.g., polytetrafluoroethylene) bearing blocks 48 and 49, respectively, which together substantially restrain motion of the rods and therefore the mirrors 7 and 8 in any other direction. Mount 44 is provided with a strengthening rib 50 to which one end of chain 41 (equivalent to the steel cable 41 of FIG. 2) is attached, the other end being fixed to the circumferential groove of pulley 40. Close to the point of attachment of chain 41 to rib 50, one end of a constant-force "Tensator" (i.e., negator) spring 51 is also secured, the other end being fixed to a pin 52 around which the spring is curled. Pin 52 is secured to the bracket 53 and the latter is in turn secured to a gantry-like frame 54 attached by feet 55 to the bedplate (not shown) of the monochromator.

Chain 41 is guided round pulleys 42 and 43. From the fixing point of chain 41 to pulley 40 a further length of chain 41 (which further length has no counterpart in FIG. 2) is extended around pulleys 56 and 57 and finally anchored to a part of rib 50 which continues under mirror 8. Pulleys 56 and 57 are attached to a plate (not shown) secured to the frame 54. Bearing blocks 48 and 49 are also secured to frame 54. Lever 33 in FIG. 2 has not been repeated in FIG. 4 for clarity but it engages the pinion 37 which in FIG. 4 is hidden by the pulley 40. The exemplary construction of FIG. 4 provides a rigid mount for mirrors 7 and 8 that is free only to move up and down between limits with a smooth motion in which the effect of gravity is largely counteracted by the constant force spring 51.

In FIG. 5 a monochromator incorporating the present invention and schematically represented as in FIG. 1 is shown as part of a double-beam (say, infrared) spectrophotometer. The monochromator parts already identified with reference to FIG. 1 are identified by like references for like parts and are not described again, except to note that the exit slit 5 has been repositioned for convenience and the plane mirror PM added to bend the monochromator beam thereto. The image of slit 5 is formed on the detector DE by ellipsoid mirror EM.

The other parts of the spectrophotometer are quite conventional. Starting from the (say, infrared) source 60 two identical optical channels are provided, the reference channel R and the measuring channel M. It will therefore be sufficient to describe the latter, which comprises plane mirror 61, toroid 62 focussing an image of the source 60 at a sample station ST, toroid 63, and plane mirror 64. A sector mirror 65, rotated by motor 66 ensures that the reference beam and the measuring beam are alternately routed onto toroid 67, toroid 68, and plane mirrors 69 and 70, so that an image of the source 60 is focussed at the entry slit 1 of the monochromator. Although the monochromator shown in FIG. 5 conforms to the schematic form shown in FIG. 1, it is naturally intended to represent alternatively the more detailed form shown in FIG. 2 and further detailed in FIG. 4.

What is claimed is:

1. In an optical apparatus comprising means for defining the path of a radiant energy beam, a first radiant energy receiving member in the path of said beam, a second radiant energy receiving member, and means selectively introducible into said radiant energy beam path for causing deflection of said radiant energy so as to direct it onto said second receiving member, the improvement comprising:

said selective deflection means comprising a pair of plane specular reflectors rigidly mounted generally face to face in a non-skew fixed angular relationship, thereby forming a rigid twin-reflector assembly;

means for constraining said twin-reflector assembly to movement along a linear direction mutually parallel to the surfaces of said plane reflectors;

and means for moving said twin-reflector assembly along said linear direction into and out of an operative position in which said assembly deflects said radiant energy beam to said second receiving member, whereby any undesired angular rotations of said twin-reflector assembly about said linear direction does not change the direction the deflected radiant energy beam impinges upon said second receiving member.

2. An optical apparatus according to claim 1, in which: said pair of plane specular reflectors are rigidly mounted in parallel relationship, whereby the radiant energy beam, after deflection by said twin-reflector assembly in its operative position, is parallel to the original radiant energy beam path.

3. An optical apparatus according to claim 1, further comprising:

said first and second radiant energy receiving members being movably mounted;

means for causing movement of said first and second radiant energy receiving members;

and means operatively interconnecting said movement causing means and said means for moving said twin-reflector assembly, whereby said twin-reflector assembly is moved into and out of said operative position at particular positions of movement of said first and second radiant energy receiving members.

4. An optical apparatus according to claim 3, in which:

said movement causing means, said twin-reflector assembly moving means, and said operatively interconnecting means are of such construction and so operatively connected that all said means may be operated in either a forward or reverse direction while retaining the desired relationship between movement of said first and second radiant energy receiving members and movement of said twin-reflector assembly into and out of said operative position.

5. An optical apparatus according to claim 3, in which:

said first and second radiant energy receiving members are diffraction gratings, each movably mounted for rotation about an axis parallel to an element of the grating;

an exit slit is provided in the optical path of the beam after diffraction by said gratings;

said movement causing means comprises rotary drive means for said gratings;

and said rotary drive means and said operatively interconnecting means are of such construction and so operatively connected as to cause said twin-reflector assembly to be gradually moved in one direction by said moving means when said diffraction gratings are both capable of diffracting the same overlapping spectral interval to said exit slit, whereby a continuous scanning two grating monochromator is obtained.

6. An optical apparatus according to claim 5, in which:

said gratings rotary drive comprises at least a first cam means and a pair of cam follower means, each follower means operatively connected to rotate one of said gratings;

and said twin-reflector assembly moving means and said operatively interconnecting means comprise a second cam means and follower means;

both said first and second cam means and all said follower means being of such construction and operative connection as to allow bi-direction rotation of said gratings and concurrent movement of said twin-reflector assembly in either direction of rotation of both said cam means;

whereby said scanning monochromator may be reversed to a desired starting point after forward scanning of any spectral range, so as to allow convenient repetitive forward scans of a small portion of the total spectral range.

* * * * *